United States Patent
Sakamoto et al.

(10) Patent No.: US 12,504,666 B2
(45) Date of Patent: Dec. 23, 2025

(54) OPTICAL DEFLECTOR

(71) Applicant: NTT, Inc., Tokyo (JP)

(72) Inventors: Takashi Sakamoto, Tokyo (JP); Masahiro Ueno, Tokyo (JP); Yuichi Akage, Tokyo (JP); Sohan Kawamura, Tokyo (JP); Yurina Tanaka, Tokyo (JP); Soichi Oka, Tokyo (JP)

(73) Assignee: NTT, INC., Tokyo (JP)

( * ) Notice: Subject to any disclaimer, the term of this patent is extended or adjusted under 35 U.S.C. 154(b) by 419 days.

(21) Appl. No.: 18/248,893

(22) PCT Filed: Oct. 14, 2020

(86) PCT No.: PCT/JP2020/038839
§ 371 (c)(1),
(2) Date: Apr. 13, 2023

(87) PCT Pub. No.: WO2022/079846
PCT Pub. Date: Apr. 21, 2022

(65) Prior Publication Data
US 2024/0019757 A1   Jan. 18, 2024

(51) Int. Cl.
*G02F 1/29* (2006.01)
(52) U.S. Cl.
CPC ........................ *G02F 1/29* (2013.01)
(58) Field of Classification Search
CPC ........................................................ G02F 1/29
See application file for complete search history.

(56) References Cited

U.S. PATENT DOCUMENTS

| | | | |
|---|---|---|---|
| 9,219,343 | B1 | 12/2015 | Dew et al. |
| 10,205,296 | B2 | 2/2019 | Toyoda et al. |
| 11,422,428 | B2 | 8/2022 | Sakamoto et al. |

FOREIGN PATENT DOCUMENTS

| | | | |
|---|---|---|---|
| CN | 205985728 U | | 2/2017 |
| JP | 2013195916 A | | 9/2013 |
| JP | 2016038465 A | | 3/2016 |
| JP | 6193773 B | | 8/2017 |
| JP | 2017203847 A | * | 11/2017 |
| JP | 2017219732 A | | 12/2017 |
| JP | 2018093192 A | | 6/2018 |
| JP | 2019215462 A | | 12/2019 |

* cited by examiner

*Primary Examiner* — Edmond C Lau
(74) *Attorney, Agent, or Firm* — Slater Matsil, LLP

(57) ABSTRACT

An optical deflector which includes a dielectric having a paraelectric phase and a trap for storing an electric charge therein and deflects light transmitted through the dielectric by applying a voltage in a direction perpendicular to a transmission direction of the dielectric is provided. The optical deflector includes a first conductor, the dielectric, a second conductor, and two insulators in contact with both side surfaces parallel to a voltage application direction of the dielectric between the first conductor and the second conductor in this order, wherein a voltage is applied between the first conductor and the second conductor, a temperature of the first conductor and the second conductor is controlled independently, and one of the side surfaces of the dielectric is irradiated with excitation light through one insulator.

15 Claims, 16 Drawing Sheets

OPTICAL DEFLECTOR

CROSS-REFERENCE TO RELATED APPLICATIONS

This patent application is a national phase filing under section 371 of PCT application no. PCT/JP2020/038839, filed on Oct. 14, 2020, which application is hereby incorporated herein by reference in its entirety.

TECHNICAL FIELD

The present invention relates to an optical deflector using a dielectric with a paraelectric phase.

BACKGROUND

Optical deflectors can change a traveling direction of light by applying a voltage and are used in various optical devices such as laser printers and wavelength sweep light sources. Japanese Patent No. 6193773 ("Patent Literature 1") describes a wavelength sweeping light source which includes an optical deflector using a KTN ($KTa_{1-x}Nb_xO_3$, 0<x<1) crystal as an electro-optical material and is capable of stable operation for a long time. In the optical deflector using KTN, an internal electric field is generated by charge injection and light can be deflected at a high speed and a wide angle.

Further, Japanese Patent Application Publication No. 2017-219732 ("Patent Literature 2") describes a technique in which a time required for electron injection into the trap to reach a steady state is shortened by superimposing an AC voltage on a DC voltage, applying them, and irradiating the KTN in the optical deflector with excitation light.

Japanese Patent Application Publication No. 2019-215462 ("Patent Literature 3") describes an optical deflector 90 having a temperature control mechanism as well as a light irradiation mechanism, as shown in FIG. 10. The optical deflector 90 includes sensors 906 and 907 in an anode-side metal block 902 and a cathode-side metal block 903, respectively, and a temperature is controlled by Peltier elements 908 and 909, respectively. The temperature in a KTN crystal 901 can be inclined and a dielectric constant can be inclined through this temperature control. It is possible to prevent an instantaneous value dependence of a drive voltage of a lens effect of the KTN crystal through optimizing this.

CITATION LIST

Patent Literature

[PTL 1] Japanese Patent No. 6193773.
[PTL 2] Japanese Patent Application Publication No. 2017-219732.
[PTL 3] Japanese Patent Application Publication No. 2019-215462.

SUMMARY

Technical Problem

However, since the electro-optical material (for example, KTN crystal) is only disposed between the cathode-side metal block and the anode-side metal block in the above-mentioned optical deflector configuration in the related art, a position and orientation of the electro-optical material are not always stable.

Specifically, the electro-optical material can be disposed to face in any direction. An incident end surface 9011 is disposed at an arbitrary angle with respect to incident light 92 (solid line in the drawing) in some cases even if the incident end surface 9011 of the electro-optical material 901 is designed to be perpendicular to the incident light 92 (dotted line in the drawing) as shown in FIG. 11. In this case, the characteristics of the optical deflector 90 vary depending on an angle of the incident end surface 9011. Thus, if the angle of the incident end surface 9011, in other words, an orientation of the electro-optical material 901, changes arbitrarily when the optical deflector 90 is manufactured, reproducibility of the characteristics of the optical deflector 90 cannot be obtained.

Furthermore, in the configuration of the optical deflector 90 in the related art, the position and orientation of the electro-optical material 901 may change in some cases due to vibration due to the electrostriction of the electro-optical material 901 when the optical deflector 90 is driven. This becomes a problem because it makes the characteristics of the optical deflector 90 at the time of driving unstable.

Solution to Problem

In order to solve the problem mentioned above, an optical deflector according to embodiments of the present invention is an optical deflector which includes a dielectric having a paraelectric phase and a trap for storing electric charge therein and deflects light transmitted through the dielectric by applying a voltage in a direction perpendicular to a transmission direction of the dielectric, the optical deflector comprising a first conductor, the dielectric, a second conductor, and two insulators in contact with both side surfaces parallel to a voltage application direction of the dielectric between the first conductor and the second conductor in this order, in which a voltage is applied between the first conductor and the second conductor, a temperature of the first conductor and the second conductor is controlled independently, and one of the side surfaces of the dielectric is irradiated with excitation light through the insulator.

Also, an optical deflector according to embodiments of the present invention is an optical deflector which includes a dielectric having a paraelectric phase and a trap for storing an electric charge therein and deflects light transmitted through the dielectric by applying a voltage in a direction perpendicular to a transmission direction of the dielectric, the optical deflector comprising a first conductor, a plurality of the dielectrics, a second conductor, and two insulators which fit into a proximal end of one of the dielectric and a proximal end of another dielectric of at least two of the dielectrics in this order, in which the two insulators are disposed to have the plurality of dielectrics disposed therebetween, a voltage is applied between the first conductor and the second conductor, the plurality of dielectrics are irradiated with excitation light via one of the insulators, and the transmitted light is reflected a plurality of times and emitted a plurality of times at the end surfaces of the plurality of dielectrics.

Advantageous Effects of Embodiments of the Invention

According to embodiments of the present invention, it is possible to provide an optical deflector having excellent reproducibility and stability.

DETAILED DESCRIPTION OF ILLUSTRATIVE EMBODIMENTS

First Embodiment

Figure 1:
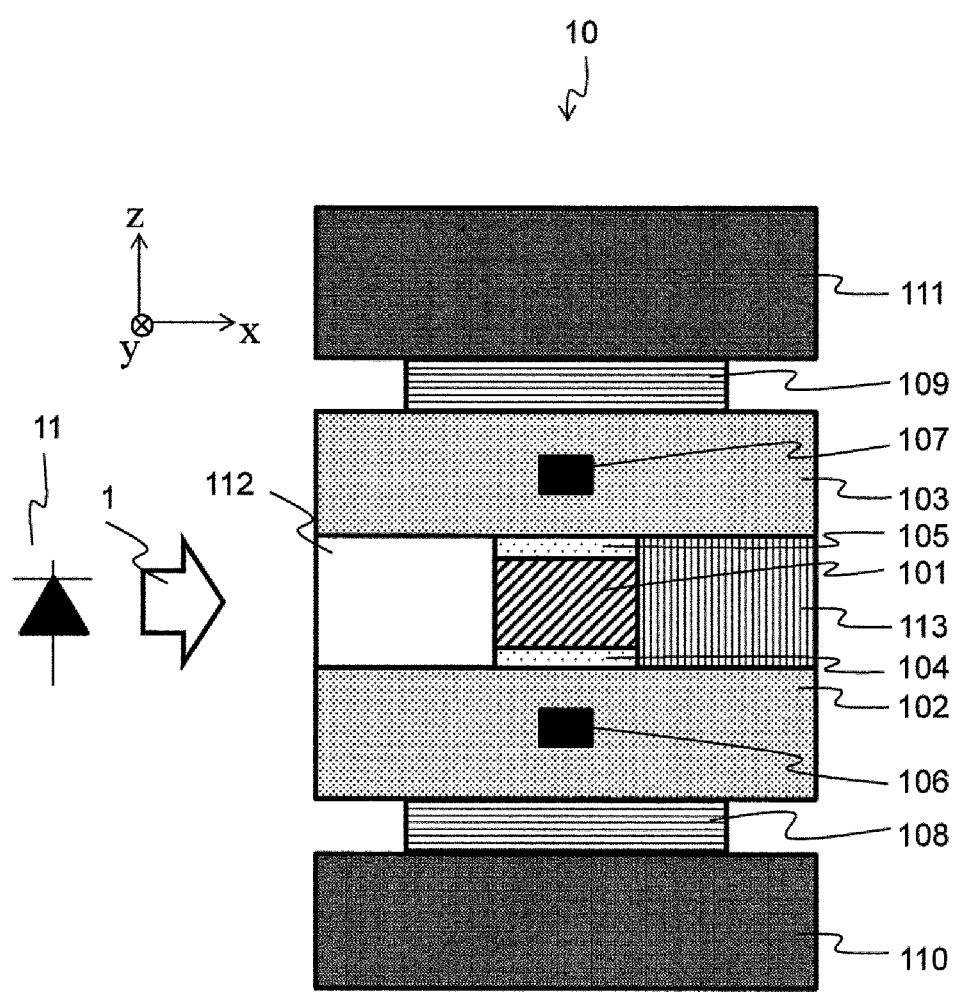
FIG. 1 is a front view showing a configuration of an optical deflector according to a first embodiment of the present invention.

An optical deflector according to a first embodiment of the present invention will be described with reference to FIGS. 1 and 2.
Configuration of Optical Deflector As shown in FIG. 1, an optical deflector 10 according to the embodiment includes, in this order, an anode-side metal block 102, a KTN crystal 101, and a cathode-side metal block 103 and includes conductive elastic bodies 104 and 105 between the KTN crystal 101 and the anode-side metal block 102 and between the KTN crystal 101 and the cathode-side metal block 103, respectively.

Furthermore, insulators 112 and 113 are provided between the anode-side metal block 102 and the cathode-side metal block 103. The KTN crystal 101 has two side surfaces parallel to a yz plane parallel to a traveling direction (y direction) of light transmitted (deflected) through the KTN crystal 101. The insulator 112 is disposed in contact with one side surface of the KTN crystal 101. The insulator 113 is disposed in contact with the other side surface of the KTN crystal 101. In other words, the insulators 112 and 113 are disposed to have the KTN crystal 101 and the conductive elastic bodies 104 and 105 disposed therebetween in an x direction.

The conductive elastic bodies 104 and 105 are disposed to prevent damage due to deformation of the KTN crystal when a voltage is applied and a material which absorbs the deformation of the KTN crystal such as a carbon sheet is used.

The anode-side metal block 102 includes a temperature sensor 106 and a Peltier element (temperature control element) 108 and a heat sink 110 are provided on the surface of the anode-side metal block 102 facing the surface of the anode-side metal block 102 on the KTN crystal 101. Similarly, the cathode-side metal block 103 includes a temperature sensor 107 and a Peltier element (temperature control element) 109 and a heat sink in are provided on the surface of the cathode-side metal block 103 facing the surface of the cathode-side metal block 103 on the KTN crystal 101. The Peltier elements (temperature control elements) 108 and 109 may be disposed on the anode-side metal block 102 and the cathode-side metal block 103 respectively so that heat (temperature) can be transferred to the anode-side metal block 102 and the cathode-side metal block 103, respectively.

The Peltier controller (temperature control unit, not shown) controls the Peltier elements 108 and 109 to control the temperature on the basis of the temperature measured by the temperature sensors 106 and 107.

Furthermore, the excitation light source 11 is disposed to irradiate the KTN crystal 101 with excitation light 1.

Furthermore, the insulators 112 and 113 are electrical insulators.

Furthermore, the insulator 112 is transparent with respect to the excitation light 1 radiated from the excitation light source 11. Here, being transparent does not mean that the transmittance can be regarded as 100% and means having a finite transmittance sufficient to transmit the optical power required to excite the electrons trapped in the KTN crystal 101.

As a result, it becomes possible to irradiate the KTN crystal 101 with the excitation light without forming holes for passing the irradiation light in the insulators 112 and 113.

As the irradiation light, it is preferable to use ultraviolet light to purple light. Particularly, light having a center wavelength of 400 nm to 405 nm is preferable.

Specific examples of the insulator 112 include quartz glass, acrylic, polycarbonate, polystyrene, and the like.

Furthermore, the insulator 113 may not be transparent with respect to the excitation light 1 radiated from the excitation light source 11. Of course, the insulator may be transparent.

Figure 2:
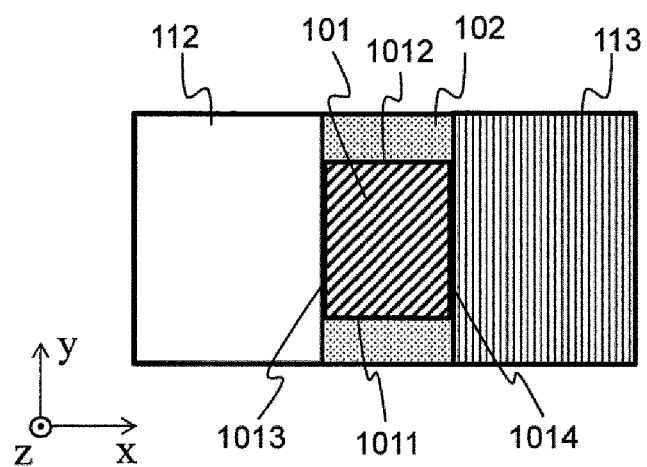
FIG. 2 is a top view showing a part of the configuration of the optical deflector according to the first embodiment of the present invention.

FIG. 2 shows a top view of a portion of the optical deflector 10 including a KTN crystal 101, an anode-side metal block 102, a conductive elastic body 104, and insulators 112 and 113. Here, the conductive elastic body 104 is not shown because it is disposed directly under the KTN crystal 101. Furthermore, in the configuration of the optical deflector 10, the conductive elastic body 105 (not shown) is disposed on the KTN crystal 101.

The KTN crystal 101 has an incident end surface 1011 (parallel to an xz plane) perpendicular to the incident direction (y direction) of the light transmitted (deflected) through the optical deflector and an exit end surface 1012 facing the incident end surface 1011. Furthermore, the KTN crystal 101 has side surfaces 1013 and 1014 which are perpendicular to the incident end surface 1011 and the exit end surface 1012 and parallel to the plane (yz plane) parallel to the voltage application direction.

The KTN crystal 101 and the conductive elastic bodies 104 and 105 have substantially the same shape in the xy plane.

The insulators 112 and 113 are in contact with the side surfaces 1013 and 1014 of the KTN crystal 101. In this way, when the KTN crystal 101 is disposed between the insulators 112 and 113 from both side surfaces and fixed, the positions of the KTN crystal 101 in the x and z directions and the angle of the incident end surface with respect to the incident light, in other words, the orientation of the KTN crystal 101, is uniquely determined with respect to the insulators 112 and 113.

Similarly, the positions and angles (directions) of the conductive elastic bodies 104 and 105 disposed above and below the KTN crystal 101 are also uniquely determined with respect to the insulators 112 and 113.

Therefore, if the positions and orientations of the insulators 112 and 113 are uniquely determined with respect to the anode-side metal block 102, the positions of the KTN crystal 101 and the conductive elastic bodies 104 and 105 in the x and z directions and the angle of the incident end surface with respect to the incident light are uniquely determined with respect to the anode-side metal block 102.

Here, in order to uniquely determine the positions and orientations of the insulators 112 and 113 with respect to the anode-side metal block 102, for example, the insulators 112 and 113 and the anode-side metal block 102 may be adhered to each other or may be fixed by other methods.

As described above, although the position of the KTN crystal 101 in the y direction cannot be uniquely determined in the optical deflector according to the embodiment, the positions of the KTN crystal 101 in the x direction and the z direction and the angle of the incident end surface with respect to the incident light can be uniquely determined.

The temperatures of the anode-side metal block 102 and the cathode-side metal block 103 are independently controlled. Here, since it is preferable that the thermal resistance between the anode-side metal block 102 and the cathode-side metal block 103 be large so that the temperature controls do not interfere with each other, it is preferable that the thermal conductivity of the insulators 112 and 113 be small.

The thermal conductivity of the above-mentioned insulators 112 and 113 is 1.4 W/(m·K) for quartz glass, 0.21 W/(m·K) for acrylic, 0.19 W/(m·K) for polycarbonate, and 0.10 to 0.14 W/(m·K) for polystyrene.

On the other hand, the thermal conductivity of the KTN crystal 101 is about 10 to 20 W/(m·K) at room temperature. Therefore, since the thermal conductivity of the insulators 112 and 113 is sufficiently smaller than the thermal conductivity of the KTN crystal 101 which is a KTN crystal, the effect of the arrangement of the insulators 112 and 113 on the thermal resistance between the anode-side metal block 102 and the cathode-side metal block 103 is sufficiently small.

According to the optical deflector 10 according to the embodiment, the positions of the KTN crystal 101 in the x and z directions and the angle of the incident end surface with respect to the incident light (direction of the KTN crystal 101) can be uniquely determined. Thus, the reproducibility of the characteristics of the optical deflector 10 can be improved when the optical deflector 10 is manufactured and the stability of the characteristics when the optical deflector 10 is driven can be improved.

Second Embodiment

A second embodiment of the present invention will be described with reference to FIGS. 3A to 4.

Configuration of Optical Deflector

Although an optical deflector according to the second embodiment of the present invention has substantially the same configuration as that of the first embodiment, a shape of an insulator is different.

Figure 3A:
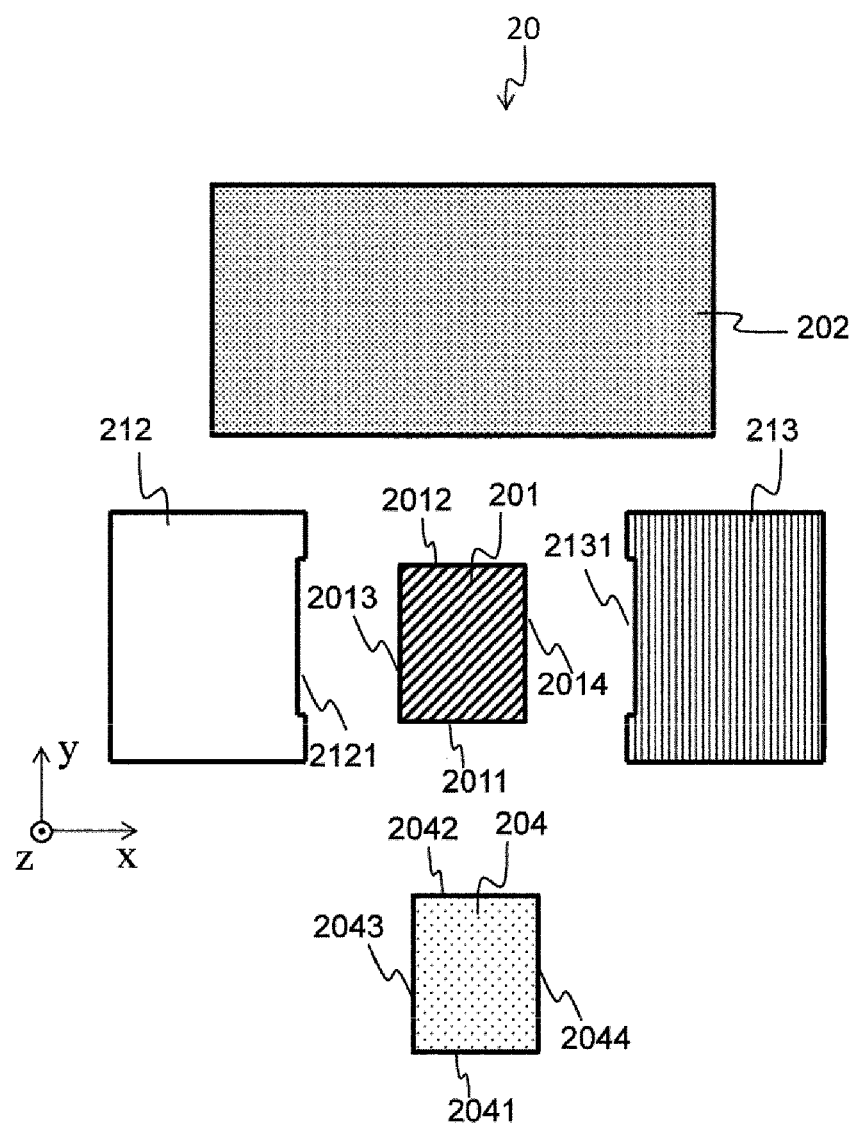
FIG. 3A is a diagram for explaining an optical deflector according to a second embodiment of the present invention.
Figure 4:
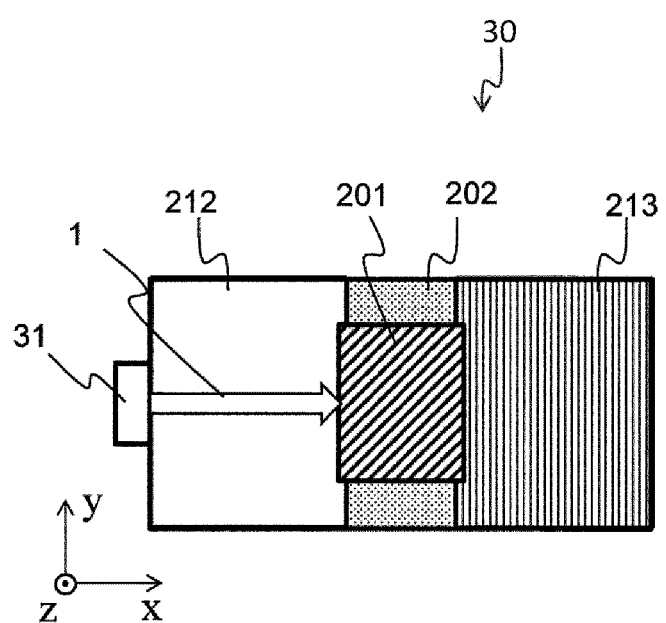
FIG. 4 is a top view showing a part of the configuration of the optical deflector according to a modified example of the second embodiment of the present invention.

FIG. 3A shows a KTN crystal 201, an anode-side metal block 202, a conductive elastic body 204, and insulators 212 and 213 which are members of the optical deflector 20 according to the embodiment. The insulators 212 and 213 have a notch which fits into the KTN crystal 201.

The shape of the KTN crystal 201 is a rectangular parallelepiped. The KTN crystal 201 has an incident end surface 2011 (parallel to the xz plane) perpendicular to the incident direction (y direction) of light transmitted (deflected) through the optical deflector and an exit end surface 2012 facing the incident end surface 2011. Furthermore, the KTN crystal 201 has the side surfaces 2013 and 2014 which are perpendicular to the incident end surface 2011 and the emitted end surface 2012 and parallel to the plane (yz plane) parallel to the voltage application direction.

The KTN crystal 201 and the conductive elastic body 204 have substantially the same shape on the xy plane.

The shape of the insulator 212 is a rectangular parallelepiped and has a notch 2121 on the surface of the KTN crystal 201. The notch 2121 has a groove shape and a rectangular cross-sectional shape.

Specifically, a width (y direction) of the notch 2121 is substantially equivalent to the length (y direction) of the side surface 2013 of the KTN crystal 201. A depth (x direction) of the notch 2121 of the insulator 212 may be about 0.1 mm to 0.5 mm and may be a predetermined depth which can be fitted with the KTN crystal 201.

In the manufacturing process of the optical deflector 20, the conductive elastic body 204, the KTN crystal 201, and the conductive elastic body 205 (not shown) are disposed on the anode-side metal block 202 in this order and the insulators 212 and 213 are fitted and disposed on the KTN crystal 201 and the conductive elastic bodies 204 and 205.

Figure 3B:
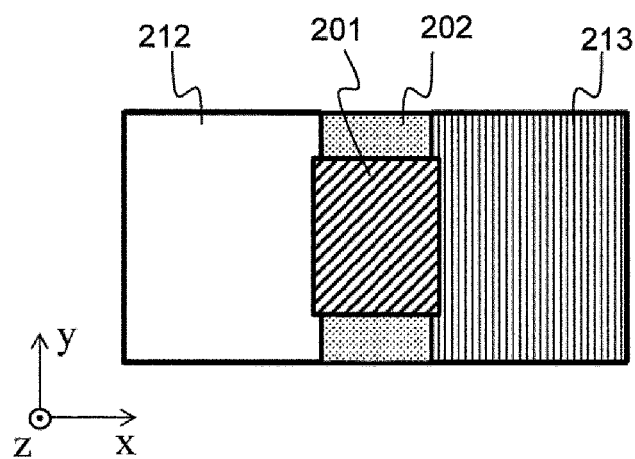
FIG. 3B is a top view showing a part of the configuration of the optical deflector according to the second embodiment of the present invention.

As a result, as shown in FIG. 3B, the KTN crystal 201, the anode-side metal block 202, the conductive elastic body 204, and the insulators 212 and 213 are disposed. Here, FIG. 3B is a top view and the conductive elastic body 204 is not shown because the conductive elastic body 204 is disposed directly under the KTN crystal 201. Furthermore, in the configuration of the optical deflector 20, the conductive elastic body 205 (not shown) is disposed on the KTN crystal 201.

Specifically, the side surface 2013 of the KTN crystal 201 and a part of each of the incident end surfaces 2011 and the exit end surfaces 2012 on both sides of the side surface 2013 are fitted with the notch 2121 of the insulator 212. Similarly, the sides of the conductive elastic bodies 204 and 205 also fit into the notch 2121 of the insulator 212.

Furthermore, the side surface 2014 of the KTN crystal 201 and a part of each of the incident end surfaces 2011 and the exit end surfaces 2012 on both sides of the side surface 2014 are fitted with the notch 2131 of the insulator 213. Similarly, the side surfaces of the conductive elastic bodies 204 and 205 also fit into the notch 2131 of the insulator 213.

The position of the KTN crystal 201 and the angle of the incident end surface with respect to the incident light (direction of the KTN crystal 201) are uniquely determined with respect to the insulators 212 and 213 by fitting and fixing the KTN crystal 201 to the insulator 212 or 213 in this way. Thus, if the position and orientation (angle of the surface of the notch) of the insulators 212 and 213 are uniquely determined with respect to the anode-side metal block 202, the position of the KTN crystal 201 and the angle of the incident end surface with respect to the incident light (direction of the KTN crystal 201) are uniquely determined with respect to the anode-side metal block 202.

Here, in order to uniquely determine the position and orientation of the insulator 212 or 213 with respect to the anode-side metal block 202, for example, the insulator 212 or 213 and the anode-side metal block 202 may be adhered to each other or may be fixed using other methods.

Furthermore, the insulator 212 is transparent with respect to the excitation light radiated from the excitation light source, as in the first embodiment. Furthermore, the insulator 213 may not be transparent with respect to the excitation light radiated from the excitation light source and may of course be transparent.

As described above, in the optical deflector according to the embodiment, not only the positions of the KTN crystal 201 in the x and z directions and the angle of the incident end surface with respect to the incident light, but also the position of the KTN crystal 201 in the y direction can be uniquely determined.

According to the optical deflector according to the embodiment, not only the positions of the KTN crystal 201 in the x and z directions and the angle of the incident end surface with respect to the incident light (direction of the KTN crystal 201) but also the position of the KTN crystal 201 in the y direction can be uniquely determined. Thus, the reproducibility of the characteristics of the optical deflector can be further improved when the optical deflector is manufactured and the stability of the characteristics when the optical deflector is driven can be further improved.

Modified Example

In the optical deflector 30 according to the embodiment, the excitation light source is disposed to be integrated with the optical deflector. As shown in FIG. 4, in the insulator 212 which is transparent to the excitation light 1, the excitation light source 31 is disposed on the surface facing the surface in contact with the KTN crystal 201. The KTN crystal 201 is radiated with the excitation light 1 radiated from the excitation light source 31.

Third Embodiment

Figure 5:
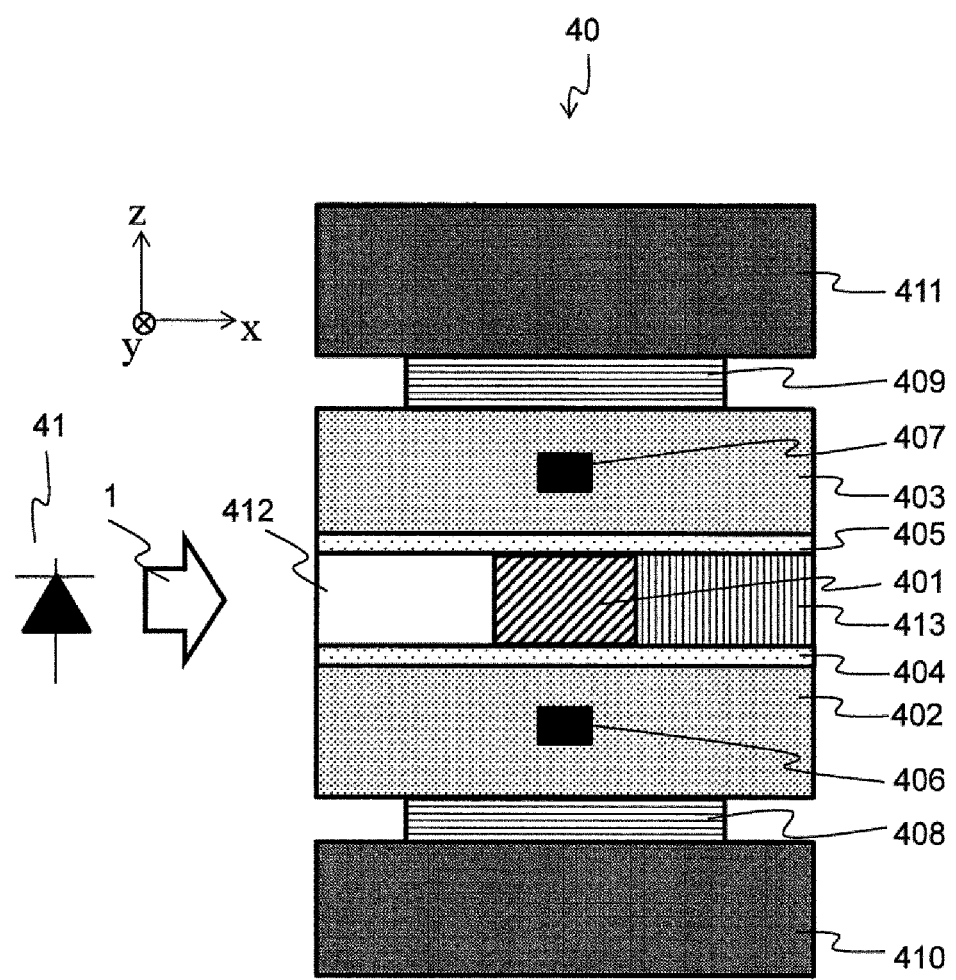
FIG. 5 is a front view showing a configuration of an optical deflector according to a third embodiment of the present invention.

A third embodiment of the present invention will be described with reference to FIGS. 5 to 6B. Although an optical deflector according to the third embodiment of the present invention has substantially the same configuration as that of the second embodiment, a shape and disposition of a conductive elastic body are different.
Configuration of Optical Deflector As shown in FIG. 5, an optical deflector 40 according to the embodiment includes, in this order, an anode-side metal block, a conductive elastic body, a KTN crystal, a conductive elastic body, and a cathode-side metal block.

Furthermore, insulators 412 and 413 are provided between conductive elastic bodies 404 and 405. A KTN crystal 401 has two side surfaces parallel to the yz plane parallel to a traveling direction (y direction) of light transmitted (deflected) through the KTN crystal 401. The insulator 412 is disposed in contact with one side surface of the KTN crystal 401. The insulator 413 is disposed in contact with the other side surface of the KTN crystal 401. In other words, the insulators 412 and 413 are disposed to have the KTN crystal disposed therebetween in the x direction.

Figure 6A:
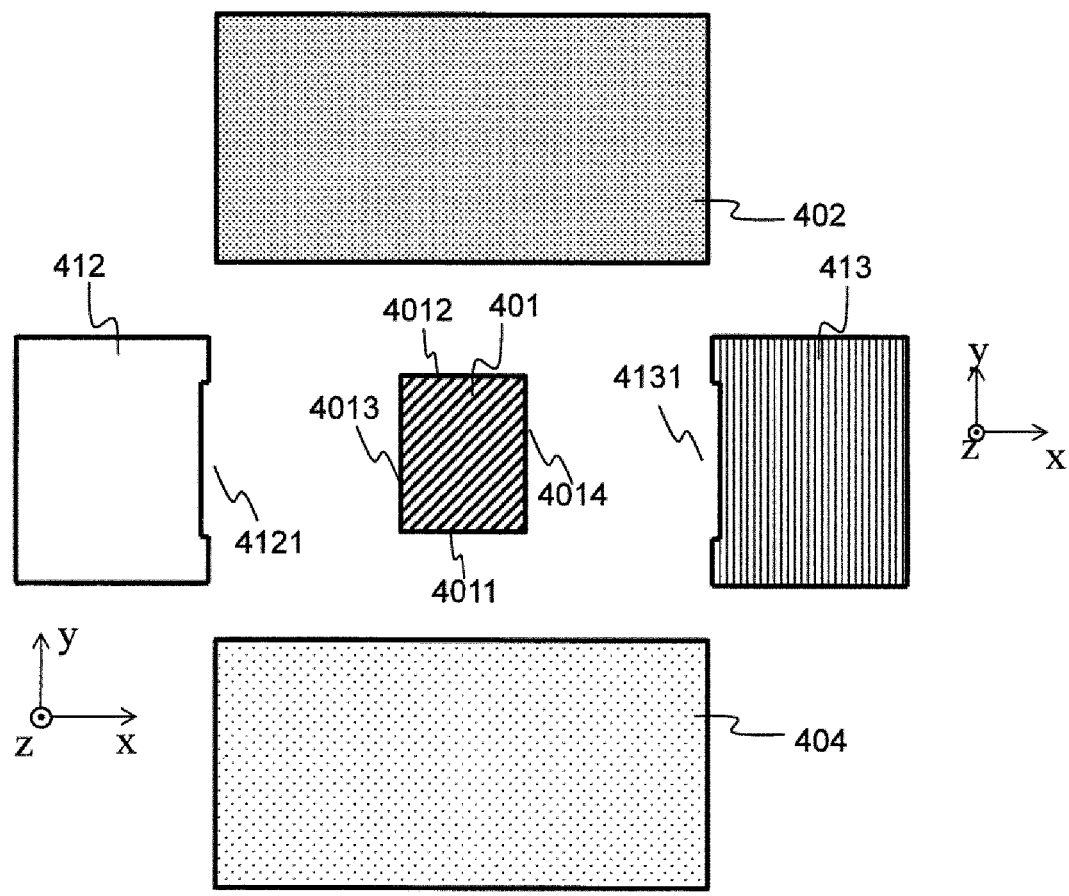
FIG. 6A is a diagram for explaining the optical deflector according to the third embodiment of the present invention.

FIG. 6A shows the KTN crystal 401, an anode-side metal block 402, a conductive elastic body 404, and the insulators 412 and 413 which are members of the optical deflector. The insulators 412 and 413 have a notch which fits the KTN crystal 401, as in the second embodiment.

The anode-side metal block 402 and the conductive elastic body 404 have substantially the same shape in the xy plane.

In the manufacturing process of the optical deflector 40, the conductive elastic body 404 and the KTN crystal 401 are sequentially disposed on the anode-side metal block 402 and the insulators 412 and 413 are fitted and disposed on the KTN crystal 401.

Figure 6B:
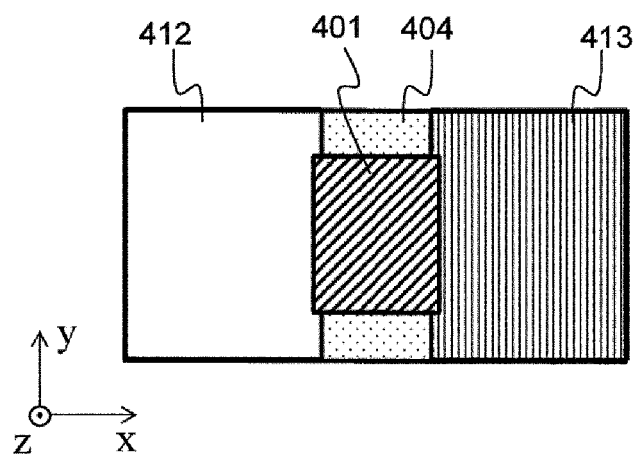
FIG. 6B is a top view showing a part of the configuration of the optical deflector according to the third embodiment of the present invention.

As a result, as shown in FIG. 6B, the KTN crystal 401, the anode-side metal block 402, the conductive elastic body 404, and the insulators 412 and 413 are disposed. Here, FIG. 6B is a top view and the anode-side metal block 402 is not shown because the anode-side metal block 402 is disposed directly under the conductive elastic body 404.

Specifically, the side surface 4013 of the KTN crystal 401 and a part of each of the incident end surfaces 4011 and the exit end surfaces 4012 on both sides of the side surface 4013 are fitted with the notch 4121 of the insulator 412.

Similarly, the side surface 4014 of the KTN crystal 401 and a part of each of the incident end surfaces 4011 and the exit end surfaces 4012 on both sides thereof are fitted with the notch 4131 of the insulator 413.

The position of the KTN crystal 401 and the angle of the incident end surface with respect to the incident light (direction of the KTN crystal 401) are uniquely determined with respect to the insulators 412 and 413 by fitting and fixing the KTN crystal 401 to the insulators 412 and 413, and the KTN crystal 401 is fixed in this way. Therefore, if the position and orientation (angle of the surface of the notch) of the insulators 412 and 413 are uniquely determined with respect to the anode-side metal block 402, the position of the KTN crystal 401 and the angle of the incident end surface with respect to the incident light (direction of the KTN crystal 401) are uniquely determined with respect to the anode-side metal block 402.

Here, in order to uniquely determine the position and orientation of the insulators 412 and 413 with respect to the anode-side metal block 402, for example, the insulators 412 and 413 and the conductive elastic body 404 may be adhered and the conductive elastic body 404 and the anode-side metal block 402 may be bonded or fixed using other methods.

As described above, in the optical deflector according to the embodiment, not only the positions of the KTN crystal 401 in the x and z directions and the angle of the incident end surface with respect to the incident light, but also the position of the KTN crystal 401 in the y direction can be uniquely determined.

According to the optical deflector 40 according to the embodiment, not only the positions of the KTN crystal 401 in the x and z directions and the angle of the incident end surface with respect to the incident light (direction of the KTN crystal 401), but also the position of the KTN crystal 401 in the y direction can be uniquely determined. Thus, the reproducibility of the characteristics of the optical deflector 40 can be improved when the optical deflector 40 is manufactured and the stability of the characteristics when the optical deflector 40 is driven can be improved, as in the second embodiment.

Fourth Embodiment

A fourth embodiment of the present invention will be described with reference to FIGS. 7A and 7B. Although an optical deflector according to the fourth embodiment of the present invention has substantially the same configuration as that of the second embodiment, a shape and configuration of a KTN crystal are different and a shape of an insulator is also different.

Configuration of Optical Deflector

Figure 7A:
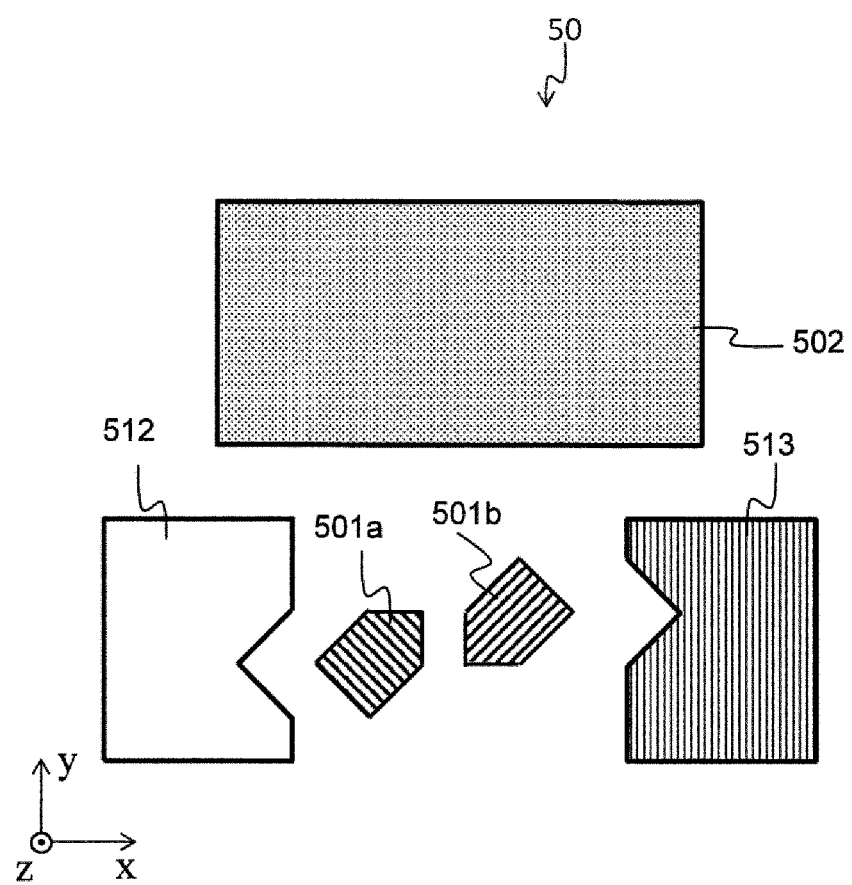
FIG. 7A is a diagram for explaining an optical deflector according to a fourth embodiment of the present invention.

FIG. 7A shows two KTN crystals 501a and 501b, an anode-side metal block 502, and insulators 512 and 513 which are members of an optical deflector 50 according to the fourth embodiment. The insulators 512 and 513 have notches which fit the KTN crystals 501a and 501b, respectively.

The KTN crystal 501a and the KTN crystal 501b have the same shape and are pentagonal prisms. An angle of a distal end portion and two angles of a base end portion are 90°, and an angle between a side surface and an end surface including the distal end portion is 135°.

Notches of the insulators 512 and 513 have a ridge angle of 90° which is an angle equivalent to the angles of the base end portions of the KTN crystals 501a and 501b.

In the manufacturing process of the optical deflector 50, the KTN crystals 501a and 501b are disposed in order on the anode-side metal block 502 and the insulators 512 and 513 are fitted and disposed on the KTN crystals 501a and 501b.

Figure 7B:
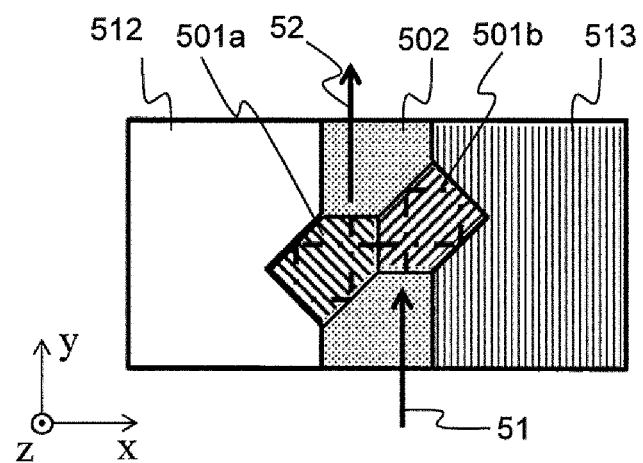
FIG. 7B is a top view showing a part of the configuration of the optical deflector according to the fourth embodiment of the present invention.

As a result, as shown in FIG. 7B, the KTN crystals 501a and 501b are disposed on the anode-side metal block 502 and the insulators 512 and 513 are disposed to have the KTN crystals 501a and 501b disposed therebetween.

Specifically, the end surface of the base end portion and one side surface of the KTN crystal 501a are in contact with the end surfaces of the notch of the insulator 512, and one of the ridges of the base end portion of the KTN crystal 501a and the notch of the insulator 512 are fitted. Similarly, the end surface of the base end portion and one side surface of the KTN crystal 501b are in contact with the end surfaces of the notch of the insulator 513, and one of the ridges of the base end portion of the KTN crystal 501b and the notch of the insulator 513 are fitted.

Furthermore, one end surface of the two end surfaces including the distal ends of the KTN crystals 501a and 501b is brought into contact with each other. The other end surface of the KTN crystal 501b which is not brought into contact becomes an incident end surface and incident light 51 is incident. On the other hand, the other end surface of the KTN crystal 501a which is not brought into contact becomes an emission end surface and emission light 52 is emitted.

As shown by the alternate long and short dash line in FIG. 7B, the incident light 51 is repeatedly reflected three times at an angle of 45° with the end surface (including the side surface) in the KTN crystal 501b and is emitted from the KTN crystal 501b. After that, the light 51 is incident on the KTN crystal 501a through the end surfaces of the KTN crystals 501b and 501a in contact with each other, is repeatedly reflected, three times at an angle of 45° with the end surface (including the side surface) in the KTN crystal 501a, and is emitted from the emission end surface.

In this way, the positions of the KTN crystals 501a and 501b and the angle of the incident end surface with respect to the incident light 51 (directions of the KTN crystals 501a and 501b) are uniquely determined with respect to the insulators 512 and 513 by fitting and fixing the KTN crystals 501a and 501b to the insulators 512 and 513. Therefore, if the position and orientation (angle of the surface of the notch) of the insulators 512 and 513 are uniquely determined with respect to the anode-side metal block 502, the positions of the KTN crystals 501a and 501b and the angle of the incident end surface with respect to the incident light (direction of the KTN crystals 501a and 501b) are uniquely determined with respect to the anode-side metal block 502.

Here, in order to uniquely determine the position and orientation of the insulators 512 and 513 with respect to the anode-side metal block 502, for example, the insulators 512 and 513 and the anode-side metal block 502 may be adhered to each other or may be fixed using other methods.

Thus, in the optical deflector 50, not only the positions of the KTN crystals 501a and 501b in the x and z directions and the angle of the incident end surface with respect to the incident light 51 but also the positions of the KTN crystals 501a and 501b in the y direction can be uniquely determined.

According to the optical deflector 50 according to the present embodiment, not only the positions of the KTN crystals 501a and 501b in the x and z directions and the angle of the incident end surface with respect to the incident light (directions of the KTN crystals 501a and 501b) but also the positions of the KTN crystals 501a and 501b in the y direction can be uniquely determined. Thus, the reproducibility of the characteristics of the optical deflector 50 at the time of manufacturing the optical deflector 50 can be further improved, and the stability of the characteristics at the time of driving the optical deflector 50 can be further improved.

According to the optical deflector 50 according to the embodiment, a size of the KTN crystal can be reduced (refer to Japanese Patent Application Publication No. 2016-38465).

Although an example in which the shapes of the two KTN crystals, which are the dielectric elements with the paraelectric phase, are pentagonal prisms of the same shape is shown in the embodiment, the shape is not limited thereto and the shape may have different shapes or other polygonal prisms. The shape may be formed so that the ridge of the base end portion of the KTN crystal can be fitted with the notch of the insulator. Furthermore, the number of KTN crystals is not limited to two and a plurality of KTN crystals may be provided. The shape may be a shape in which the end surfaces including the distal ends of each of the plurality of KTN crystals are in contact with each other, and incident light is reflected a plurality of times at the surface in one KTN crystal, goes through the contact end surfaces, is reflected a plurality of times in another KTN crystal and is finally emitted.

Although an example in which a conductive elastic body is not provided is shown in the embodiment, the present invention is not limited thereto. A conductive elastic body may be provided and destruction can be prevented if a conductive elastic body is provided.

First Example

As the optical deflector according to the first embodiment of the present invention, an example of a configuration in which a position and angle of an insulator are uniquely determined with respect to an anode-side metal block will be described. Although an optical deflector 60 according to this example has substantially the same configuration as the optical deflector 20 according to the second embodiment, there is a difference in that an insulator and the anode-side metal block are fixed using guide pins or screws.

Figure 8A:
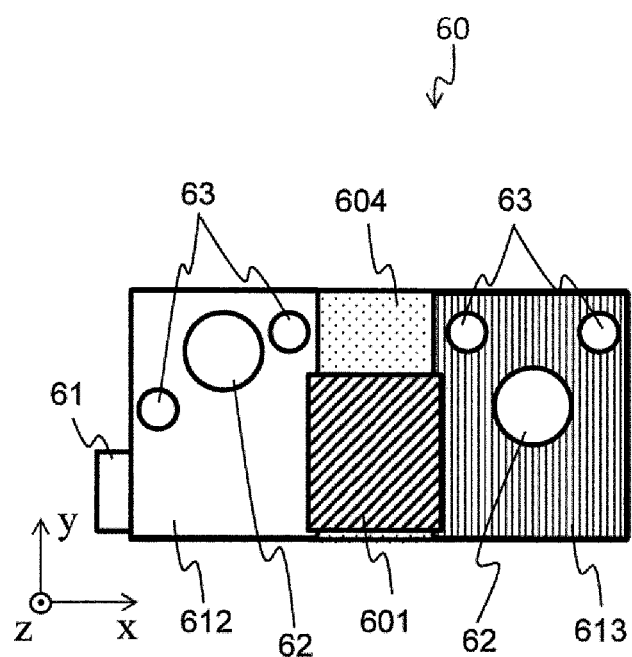
FIG. 8A is a top view showing a part of the configuration of the optical deflector according to the first embodiment of the present invention.
Figure 8B:
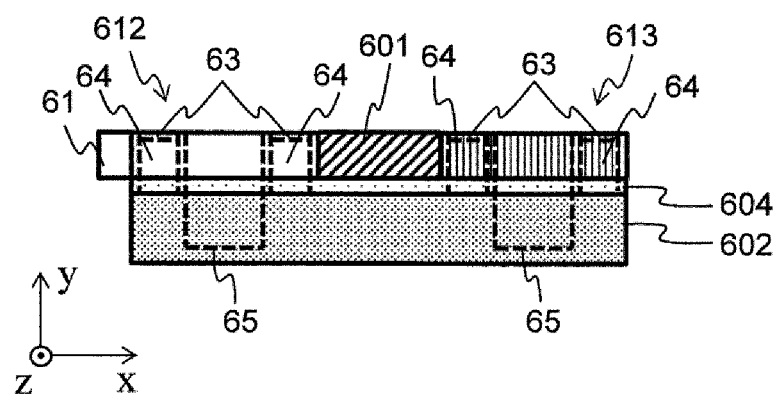
FIG. 8B is a side perspective view showing a part of the configuration of the optical deflector according to the first embodiment of the present invention.

In the optical deflector 60, as shown in FIGS. 8A and 8B, one conductive elastic body 604 and one KTN crystal 601 were disposed in this order on an anode-side metal block 602 and insulators 612 and 613 were disposed on a side surface of the KTN crystal 601 and the KTN crystal 601 and the insulators 612 and 613 were fitted to each other.

Furthermore, an excitation light source 61 was disposed to be integrated with the optical deflector 60. As shown in FIG. 8A, in the insulator 612 transparent to the excitation light, the excitation light source 61 was disposed on a surface facing a surface in contact with the KTN crystal 601. The KTN crystal 601 was radiated with the excitation light emitted from the excitation light source 61.

As shown in a top view of FIG. 8A, the insulators 612 and 613 each included one through hole 62 through which a screw passed. Furthermore, the insulators 612 and 613 included two through holes 63 through which the guide pins 64 passed.

Similarly, a through hole through which a screw passed and a through hole through which the guide pin 64 passed were provided in one conductive elastic body 604 directly below the through holes 62 and 63 of the insulators 612 and 613, respectively.

As shown in a side perspective view of FIG. 8B, the anode-side metal block 602 had four guide pins 64 on an upper surface thereof and had two holes (screw holes) 65 in which thread grooves were formed.

The guide pin 64 of the anode-side metal block 602 was inserted into the through hole 63 of the insulators 612 and 613 and the through hole of one conductive elastic body 604 immediately below the through hole 63, respectively.

In this way, a through hole having a center axis substantially the same as a central axis of the guide pin 64 of the anode-side metal block 602 was formed in the insulators 612 and 613 and one of the conductive elastic bodies 604 immediately below the insulators and the guide pin 64 was inserted into the through hole.

Here, the central axis of the guide pin 64 was perpendicular to a cross section of the guide pin 64 and was a straight line passing through the center point of the cross section. Furthermore, the central axis of the through hole was perpendicular to the surface in which the insulators 612 and 613 and the conductive elastic body 604 were in contact with each other and was a straight line passing through the center point of the through hole.

Furthermore, the expression "substantially the same" includes the term "same" and includes a difference in which the positions and angles of the insulators 612 and 613 were uniquely determined with respect to the anode-side metal block 602.

The positions and angles of the insulators 612 and 613 were uniquely determined with respect to the anode-side metal block 602 if the size and shape of the cross section of the through hole formed in the insulators 612 and 613 and one of the conductive elastic bodies 604 were substantially the same as the size and shape of the cross section of the guide pin 64.

Furthermore, the other conductive elastic body and the cathode-side metal block were sequentially disposed on the KTN crystal 601 and the insulators 612 and 613 (not shown). The other conductive elastic body and the anode-side metal block included through holes through which screws passed so that the through holes were located directly above the through holes 62 of the insulators 612 and 613.

The screws were sequentially inserted from above the cathode-side metal block into the cathode-side metal block, the through hole with the other conductive elastic body, the through hole 62 of the insulators 612 and 613, and the through hole with one conductive elastic body 604, inserted into the screw hole 65 of the metal block 602 on the anode side, and screwed into a thread groove formed in the screw hole 65.

In this way, a through hole whose central axis is substantially the same as the central axis of the screw hole 65 of the anode-side metal block 602 was formed in the cathode-side metal block, the other conductive elastic body, the insulators 612 and 613, and the one conductive elastic body 604, and the screw was inserted into the through hole, inserted into the screw hole 65, and screwed into the thread groove formed in the screw hole 65.

Here, the central axis of the screw hole 65 was perpendicular to the cross section of the screw hole 65 and was a straight line passing through the center point of the cross section. Furthermore, the central axis of the through hole was perpendicular to the surface in which the insulators 612 and 613 and the conductive elastic body 604 were in contact with each other and was a straight line passing through the center point of the through hole.

Furthermore, the expression "substantially the same" included the term "same" and included a difference in which the positions and angles of the insulators 612 and 613 were uniquely determined with respect to the anode-side metal block 602.

As a result, the insulators 612 and 613 were fixed to the anode-side metal block 602 and the positions and angles of the insulators 612 and 613 were uniquely defined with respect to the anode-side metal block 602. Thus, the position and orientation of the KTN crystal 601 were uniquely determined.

Furthermore, the positions of the through hole 62 for the screw, the screw hole 65, the through hole for the guide pin 63, and the guide pin were not formed between the excitation light source and the KTN crystal when the KTN crystal 601 was irradiated with the excitation light emitted from the excitation light source 61 so that the guide pins and screws did not interfere with the irradiation in the insulator 612 as shown in FIG. 8A. On the other hand, in the insulator 613, the positions of the through holes, the screw holes, and the guide pins are not limited to the formation in the embodiment and the positions of the through holes, the screw holes, and the guide pins may be formed at arbitrary positions.

Second Example

An optical deflector according to a second example of an embodiment of the present invention will be described. As the optical deflector according to this example, the optical deflector 20 according to the second embodiment was used.

In the optical deflector 20, a KTN crystal having an electrode spacing of 2 mm was used as the KTN crystal 201. The KTN crystal had a rectangular parallelepiped shape and a size thereof is 4.0 (y direction)×3.2 (x direction)×2.0 (z direction) mm$^3$.

An electrode film made of Ti/Pt/Au was deposited on a surface of 4.0×3.2 mm$^2$.

A temperature of the anode-side metal block 202 was controlled by controlling a Peltier element using a Peltier controller, and a temperature of the anode-side metal block 202 was set to 37.58° C. The relative permittivity of the KTN crystal, which was the KTN crystal 201, was 17,500 if the temperature of the cathode-side metal block 203 was also set to 37.58° C.

The temperature of the cathode-side metal block 203 was set to 39.08° C. to provide a temperature gradient in the KTN crystal 201. That is to say, the temperature was set 1.5° C. higher than the temperature of the anode-side metal block 202.

A sinusoidal voltage having a DC bias of 375 V, an amplitude of 285 V, and a frequency of 1 kHz was applied to deflect incident light having a wavelength of 1.06 μm while irradiating the KTN crystal with the LED light having a peak wavelength of 400 nm. As a result of continuing the deflection of the incident light for a long time in this state, the deflection characteristics could be stably maintained.

Although examples in which the shape of the KTN crystal is a rectangular parallelepiped are shown in the first to third embodiments and the first and second examples of embodiments of the present invention, the present invention is not limited thereto. The shape of the KTN crystal may be a polygonal prism. The shape may be provided so that a lateral portion (surface or angle) of the KTN crystal can be fitted to the notch of the insulator. The incident light may be reflected at the surface in the KTN crystal a plurality of times and then emitted.

Although examples in which both of the two insulators have notches are shown in the second to fourth embodiments and the first and second examples of embodiments of the present invention, the present invention is not limited thereto. The position and orientation of the KTN crystal can be uniquely determined if one of at least two insulators has a notch and is fitted with the KTN crystal.

Figure 9A:
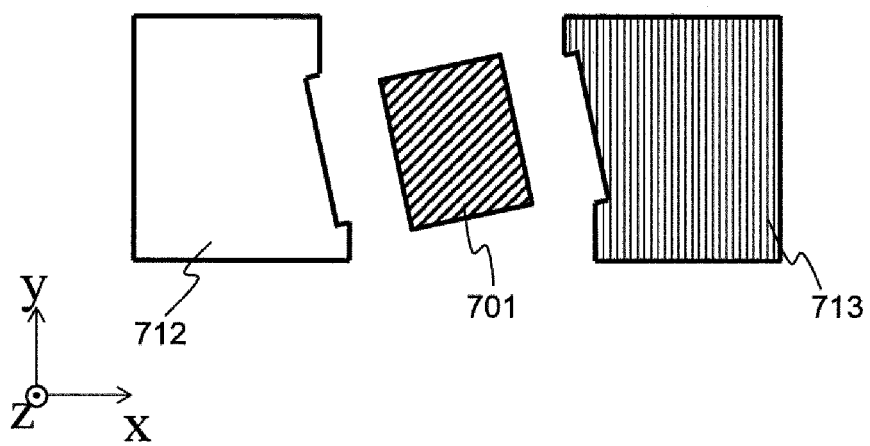
FIG. 9A is a diagram for explaining an optical deflector according to embodiments of the present invention.
Figure 9B:
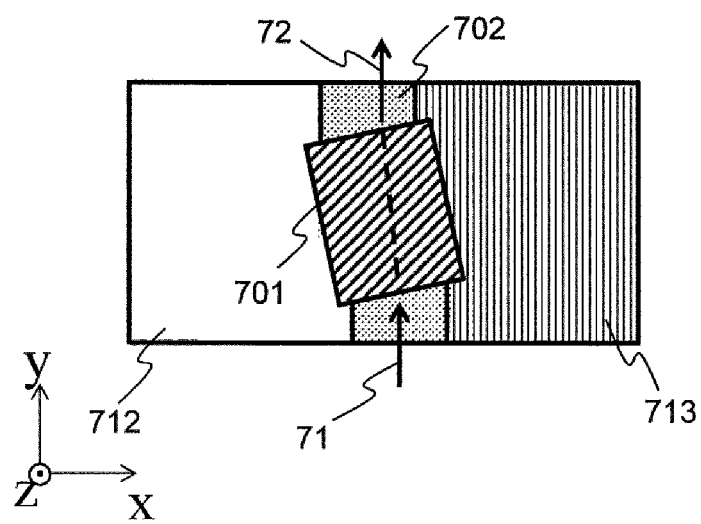
FIG. 9B is a top view showing a part of the configuration of the optical deflector according to embodiments of the present invention.
Figure 10:
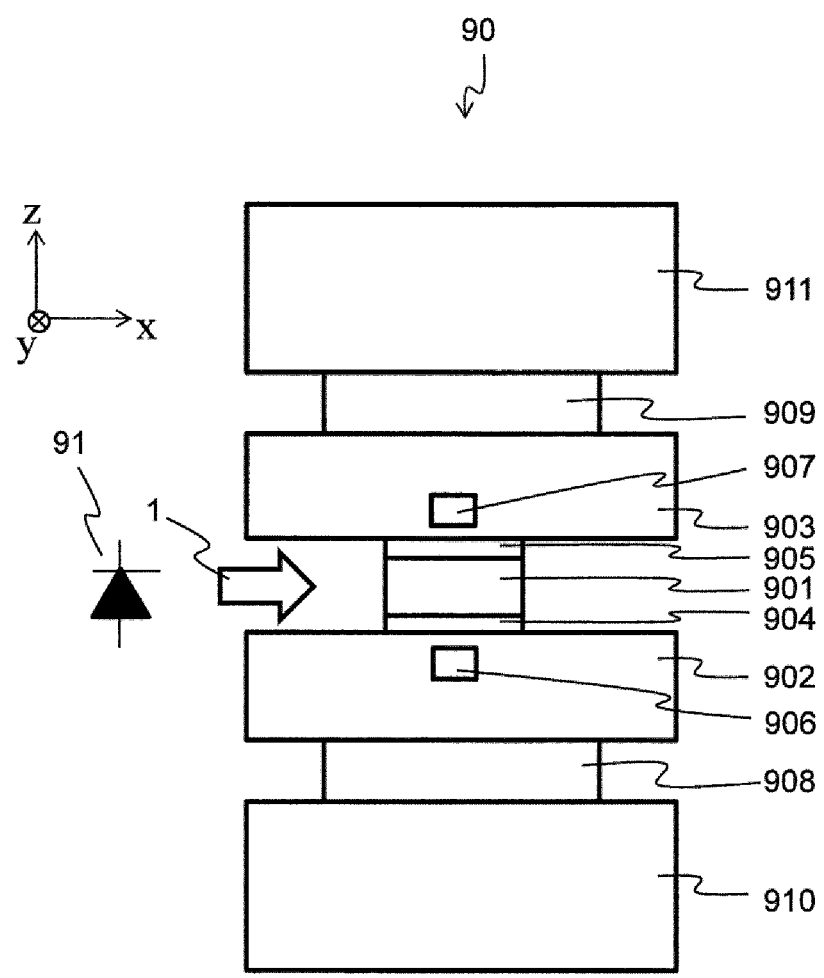
FIG. 10 is a front view showing a configuration of an optical deflector in the related art.
Figure 11:
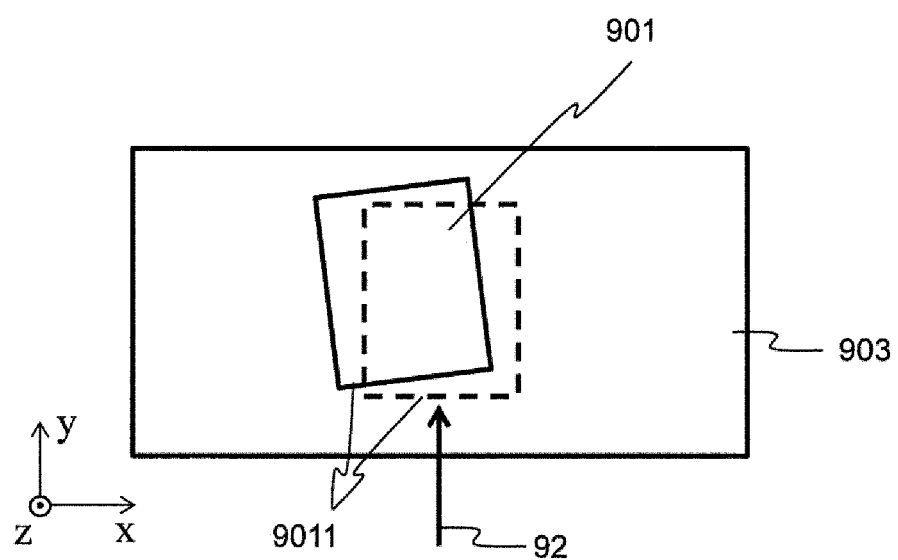
FIG. 11 is a diagram for explaining the optical deflector in the related art.

Although a case in which the incident surface of the KTN crystal is perpendicular to the incident light is shown in the embodiments and the examples of embodiments of the present invention, the present invention is not limited thereto. The incident angle may be a finite angle other than 0°. In FIG. 9A, the KTN crystal 701 is of a rectangular parallelepiped shape. The insulators 712 and 713 have a notch which fits into the KTN crystal 701. As shown in FIG. 9B, the KTN crystal 701 is disposed on the anode-side metal block 702 and the insulators 712 and 713 are disposed to have the KTN crystal 701 disposed therebetween. The incident light 71 is incident on the KTN crystal 701. The light is refracted on the incident surface on the basis of the Snell's law and then propagates in the KTN crystal 701 and is refracted on the emission surface on the basis of the Snell's law and then is emitted as output light 72. With such a configuration, it is possible to reduce the influence of the return light.

Although an example in which the insulator on the side irradiated with the excitation light is transparent is shown in the embodiments and the examples of embodiments of the present invention, the present invention is not limited thereto. A through hole may be provided in the direction of irradiating the insulator with the excitation light and the KTN crystal may be irradiated with the excitation light through the through hole.

Although an example in which a conductive elastic body is provided both between the KTN crystal and the anode-side metal block and between the KTN crystal and the cathode-side metal block is shown in the embodiments and the examples of embodiments of the present invention, the present invention is not limited thereto. A conductive elastic body may be provided between either one. Moreover, the effect in the embodiments of the present invention can be obtained even if the conductive elastic body is not provided.

Although an example in which a KTN crystal is used as the electro-optical material is shown in the embodiments and the examples of embodiments of the present invention, the present invention is not limited thereto. In addition, KLTN ($K_{1-y}Li_yTa_{1-x}Nb_xO_3$, $0<x<1$, $0<y<1$) crystals to which lithium is added may be used. Any dielectric may be used as long as it is a paraelectric phase and has a trap for accumulating electric charges therein.

Although examples of the structure, dimensions, materials, and the like of each component in the configuration of the optical deflector are shown in the embodiments and the examples of embodiments of the present invention, the present invention is not limited thereto. Anything which exerts the function of the optical deflector and exerts an effect may be used.

INDUSTRIAL APPLICABILITY

Embodiments of the present invention can be applied to various optical devices such as laser printers and wavelength sweep light sources.

The invention claimed is:

1. An optical deflector comprising:
a first conductor component;
a second conductor component;
a plurality of dielectric elements with a paraelectric phase disposed between the first conductor component and the second conductor component, each of the plurality of dielectric elements having a trap that stores an electric charge therein and being configured to allow light to be transmitted therethrough in a first direction; and
a pair of insulators disposed between the first conductor component and the second conductor component with the plurality of dielectric elements disposed therebetween, each of the pair of insulators fitting into a corresponding one of at least two of the plurality of dielectric elements;
wherein the first conductor component and the second conductor component are configured to apply a voltage to the dielectric element in a second direction perpendicular to the first direction; and
wherein the plurality of dielectric elements are configured to:
be irradiated with excitation light via one of the pair of insulators; and
to reflect the light transmitted therethrough a plurality of times, deflect the light transmitted therethrough according to the application of the voltage, and emit the light transmitted therethrough.

2. The optical deflector according to claim 1, wherein:
the first conductor component has a guide pin and a screw hole on a surface facing the plurality of dielectric elements;
each of the pair of insulators has a first through hole whose central axis is substantially the same as a first central axis of the screw hole and a second through hole whose central axis is substantially the same as a second central axis of the guide pin;
the second conductor component has a third through hole whose central axis is substantially the same as the first central axis;
the guide pin is inserted into the second through hole; and
screws are inserted into the third through hole and the first through hole and screwed into the screw hole.

3. The optical deflector according to claim 1, wherein the one of the pair of insulators is transparent.

4. The optical deflector according to claim 1, further comprising a conductive elastic body between the plurality of dielectric elements and the first conductor component or between the plurality of dielectric elements and the second conductor component.

5. The optical deflector according to claim 1, further comprising:
a first temperature control element disposed in the first conductor component;
a second temperature control element disposed in the second conductor component;
a pair of temperature sensors disposed on the first conductor component and the second conductor component, respectively;
a temperature control circuit connected to the first temperature control element and the second temperature control element; and
an excitation light source configured to emit the excitation light.

6. An optical deflector comprising:
a first conductor component;
a second conductor component;
a plurality of dielectric elements with a paraelectric phase disposed between the first conductor component and the second conductor component, each of the plurality of dielectric elements comprising:
a pentagonal prism shape having a distal end portion with a 90° angle and a base end portion with two 90° angles, and
a trap that stores an electric charge therein;
a pair of insulators disposed between the first conductor component and the second conductor component, each of the pair of insulators having a notch with a 90° ridge angle that fits into the base end portion of a corresponding one of the plurality of dielectric elements;
wherein the first conductor component and the second conductor component are configured to apply a voltage to the plurality of dielectric elements in a direction perpendicular to a light transmission direction;
wherein the plurality of dielectric elements are arranged such that distal end portions of adjacent dielectric elements are in contact with each other; and
wherein light is configured to be repeatedly reflected within each of the plurality of dielectric elements and transmitted between the dielectric elements through the contacting distal end portions.

7. The optical deflector according to claim 6, wherein each of the plurality of dielectric elements has an angle of 135° between a side surface and an end surface including the distal end portion.

8. The optical deflector according to claim 6, wherein the plurality of dielectric elements comprises two dielectric elements arranged such that one end surface of each dielectric element including the distal end portion are brought into contact with each other.

9. The optical deflector according to claim 8, wherein:
a first one of the two dielectric elements has an incident end surface configured to receive incident light; and
a second one of the two dielectric elements has an emission end surface configured to emit deflected light.

10. The optical deflector according to claim 6, wherein the plurality of dielectric elements are configured to be irradiated with excitation light via one of the pair of insulators.

11. The optical deflector according to claim 6, further comprising:
a first temperature control element disposed in the first conductor component;
a second temperature control element disposed in the second conductor component; and
a temperature control circuit configured to independently control temperatures of the first conductor component and the second conductor component.

12. An optical deflector comprising:
a first conductor component;
a second conductor component;
first and second dielectric elements with a paraelectric phase disposed between the first conductor component and the second conductor component, each dielectric element having a trap that stores an electric charge therein;
first and second insulators disposed between the first conductor component and the second conductor component, the first insulator having a first notch that receives and positions the first dielectric element, the second insulator having a second notch that receives and positions the second dielectric element;
wherein the first conductor component and the second conductor component are configured to apply a voltage to the first and second dielectric elements in a direction perpendicular to a light transmission direction;
wherein the first and second dielectric elements are positioned such that contact surfaces thereof are in contact with each other;
wherein incident light is configured to:
enter the first dielectric element through an incident surface,
reflect multiple times within the first dielectric element,
transmit from the first dielectric element to the second dielectric element through the contact surfaces,
reflect multiple times within the second dielectric element, and
exit the second dielectric element through an emission surface as deflected light.

13. The optical deflector according to claim 12, wherein:
each of the first and second dielectric elements has a pentagonal prism shape with a distal end portion having a 90° angle and a base end portion having two 90° angles;
the first notch and the second notch each have a 90° ridge angle that fits into the base end portion of the corresponding dielectric element; and
the contact surfaces are the distal end portions of the first and second dielectric elements.

14. The optical deflector according to claim 12, wherein the incident light reflects three times at a 45° angle with end surfaces within the first dielectric element and reflects three times at a 45° angle with end surfaces within the second dielectric element.

15. The optical deflector according to claim 12, wherein:
the first and second dielectric elements are configured to be irradiated with excitation light via the first insulator or the second insulator; and
at least one of the first insulator and the second insulator is transparent to the excitation light.

* * * * *